Figure 1:
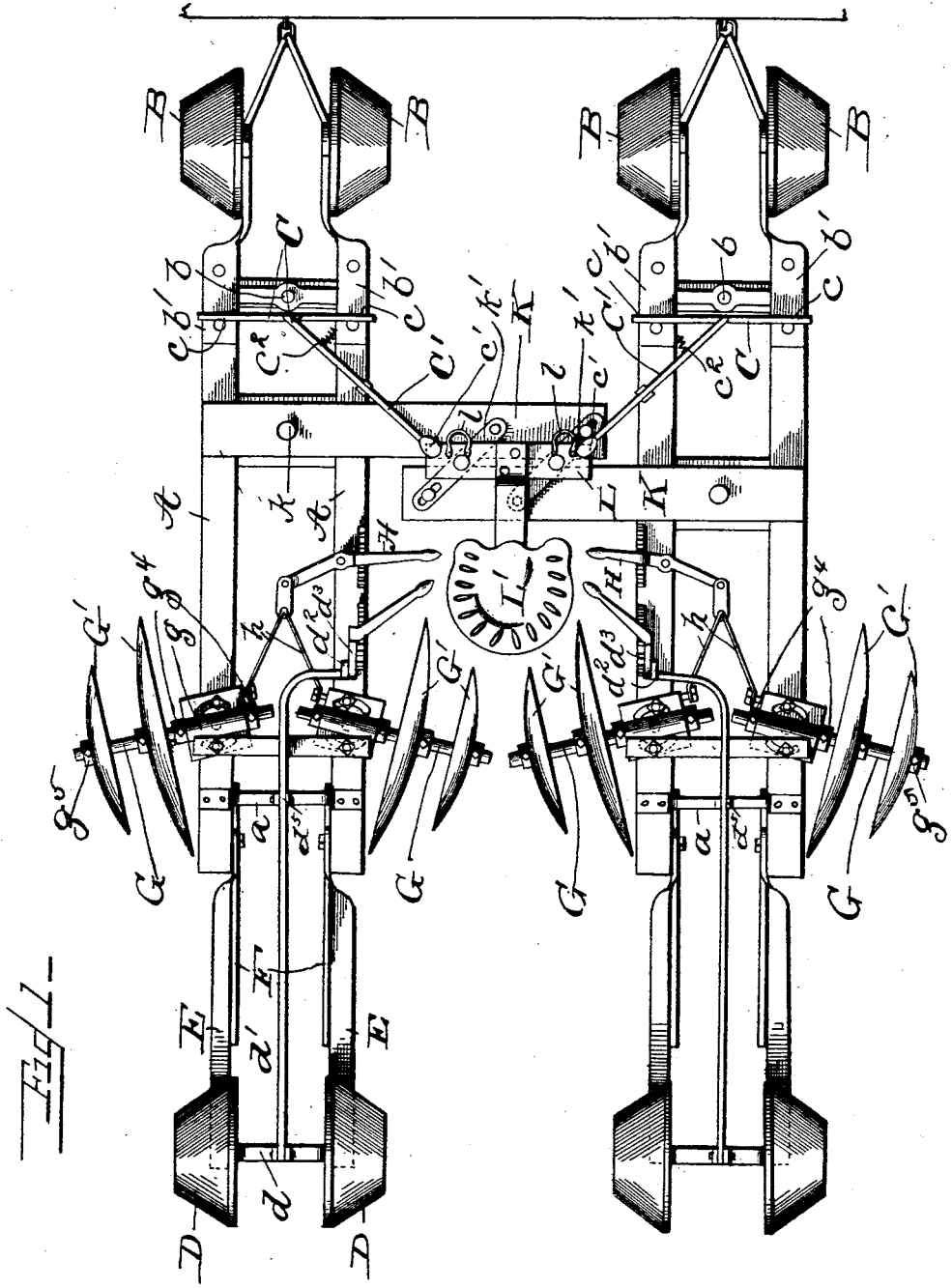

(No Model.) 2 Sheets—Sheet 1.

E. E. HARTZELL.
CULTIVATOR FOR LISTED CORN.

No. 541,230. Patented June 18, 1895.

Witnesses
D. A. Tauberschmidt
J. D. Kingsbury

Inventor
Eli E. Hartzell
By
Whitaker & Prevost
Attorneys

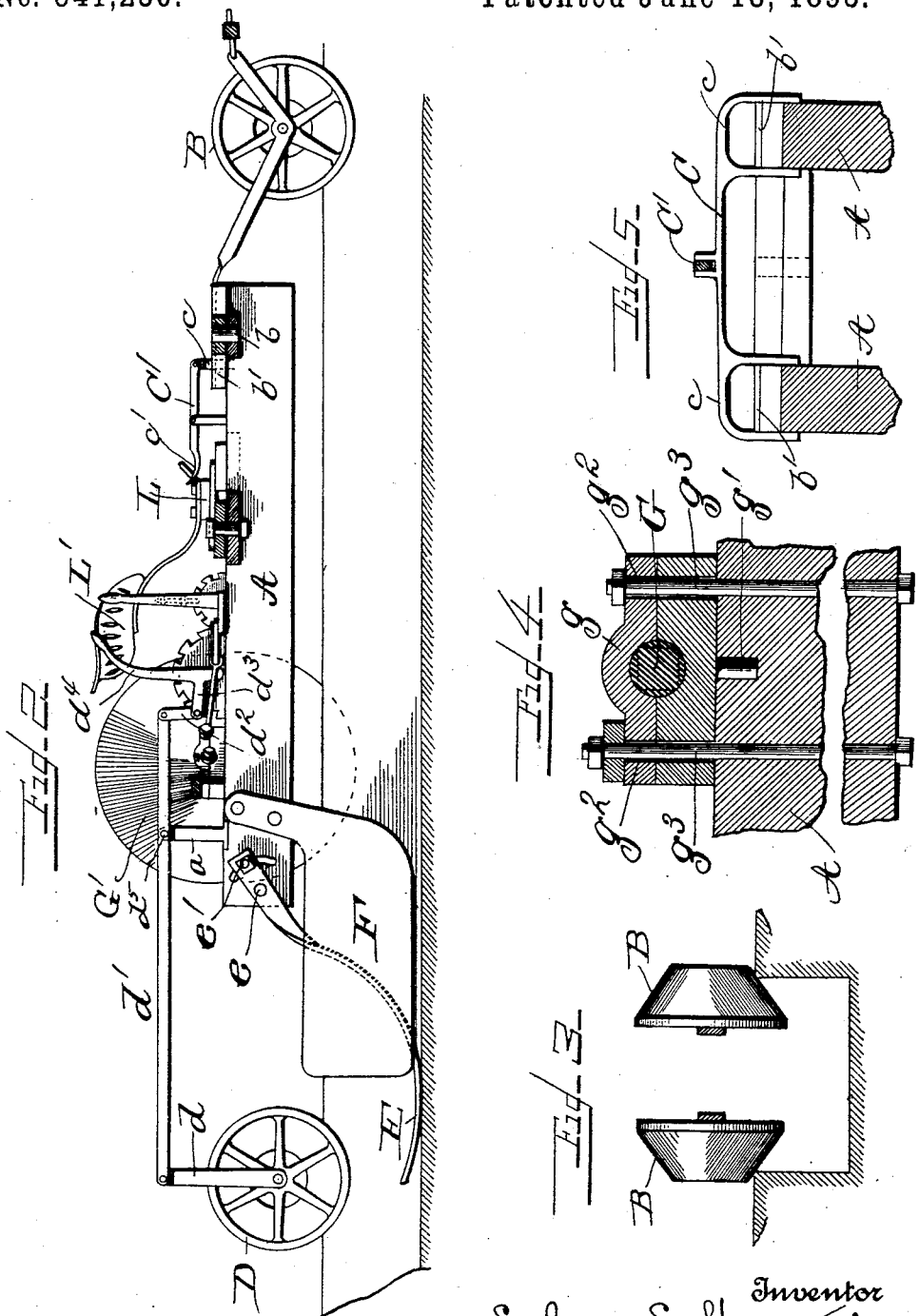

UNITED STATES PATENT OFFICE.

ELI E. HARTZELL, OF BEATRICE, NEBRASKA.

CULTIVATOR FOR LISTED CORN.

SPECIFICATION forming part of Letters Patent No. 541,230, dated June 18, 1895.

Application filed July 3, 1894. Serial No. 516,478. (No model.)

*To all whom it may concern:*

Be it known that I, ELI E. HARTZELL, a citizen of the United States, residing at Beatrice, in the county of Gage and State of Nebraska, have invented certain new and useful Improvements in Cultivators for Listed Corn; and I do hereby declare the following to be a full, clear, and exact description of the invention, such as will enable others skilled in the art to which it appertains to make and use the same.

My invention is an improvement in cultivators for listed corn and it consists in the novel features of construction and combination of parts hereinafter fully described reference being had to the accompanying drawings which illustrate one form in which I have contemplated embodying my invention and said invention is fully disclosed in the following description and claims.

Referring to the said drawings, Figure 1 is a top plan view of my improved cultivator arranged to cultivate two rows of corn. Fig. 2 is a longitudinal central section through one of the cultivator-frames. Fig. 3 is a sectional view of a listed furrow, showing the position of the guiding-rollers which carry the cultivator-frames. Fig. 4 is an enlarged sectional view of one of the pivoted boxes for the disk-shafts. Fig. 5 is an enlarged detail view of the clips for locking the forward wheel-truck in position.

My improved cultivator may be arranged to cultivate two, three or more rows of listed corn simultaneously but I have shown in the drawings a cultivator constructed according to my invention and arranged to cultivate two rows. The cultivator consists in this instance of two longitudinally disposed frames arranged side by side and as they are constructed exactly alike, a description of one will apply equally well to the other.

A A represent two longitudinal parallel bars or planks set on edge and secured together by suitable cross bars to form the main frame of one section of the cultivator. The front end of this frame is provided with a pivoted truck formed preferably of iron and carrying a pair of guiding and supporting wheels B B.

The truck is pivoted at $b$ to a cross bar of the frame and has rearwardly extending arms $b'$ $b'$ lying upon the upper edges of the bars A A and of the same width as said bars.

C represents a cross bar provided with inverted U-shaped clips $c$ $c$ which are slipped over the said arms $b'$ and engage the bars A A thus holding the truck directly in line with the main frame.

A pivoted trip lever C' is pivoted to the main frame and has one end connected to the cross bar C and the other provided with a foot piece $c'$ in reach of the driver so that the clips $c$ $c$ may be raised out of engagement with the arms $b'$ to allow the truck to turn on its pivot in turning the cultivator around at the ends of the furrows.

A spring $c^2$ connected with the trip lever holds the trip lever in operative position normally.

The guide wheels B B have cone shaped peripheries which engage the edges of the furrow as shown in Fig. 3 and act as a centering device to hold the main frame in line with the center of the furrow.

At the rear end of the main frame I preferably provide a second pair of guide wheels D D like the wheels B B and secured to a truck or axle frame $d$. A supporting bar $d'$ extends from the truck or axle frame $d$ to a point adjacent to the driver's seat where it is connected by a link $d^2$ to an arm $d^3$ secured to an adjusting lever $d^4$ (see Fig. 2) and the said supporting bar is pivoted at $d^5$ to an arch $a$ secured rigidly to the frame bars A A. I provide the lever $d^4$ with a pawl and operating lever therefor, the pawl engaging a ratchet segment in the usual manner and thus enabling the operator by means of the lever $d^4$ to raise or lower the truck $d$ and wheels D D and thereby lower or raise the rear end of the main frame. The rear end of each bar A of the main frame is also provided with a runner E engaging the bottom of the furrow and pivoted to the bar A at $e$ as shown in Fig. 2. I also prefer to provide a bolt and slot construction for adjusting the runner E as shown at $e'$ in Fig. 2 so that it will operate with furrows of different depths, and the said runners are preferably formed of steel so as to be elastic and to assist in supporting the rear end of the main frame. In this figure I have shown the bar A provided with a slot and the runner provided with an adjusting bolt engaging said slot but this adjustment of the runners may be accomplished in other usual or desired ways.

In order to prevent the dirt from being thrown down upon the young corn by the cultivating apparatus and injuring the same, I provide each of the bars A with a guard or shield F secured thereto in any desired manner.

Upon each of the bars A, I locate a pivoted box or bearing $g$ for supporting one of the disk shafts, each frame carrying two of such shafts, as shown in Fig. 1. This bearing $g$ is preferably constructed as indicated in Figs. 1 and 4, and is provided with a pivot pin $g'$ engaging a seat in the frame bar A and said box is also provided with slots $g^2$ $g^2$ concentric with the point of pivoting through which bolts $g^3$ $g^3$ are passed to secure said bearing in position and yet to permit the bearing to be turned to give more or less "gather" to the disks. The disk shaft G which may be either square or round is held in said box and is adjustable longitudinally therethrough by means of collars $g^4$ adjustably secured to the shaft as shown in Fig. 1, and the disks G' G' of which the inner one is preferably larger than the outer disk, are secured to the shaft to rotate thereon, by means of similar collars $g^5$ $g^5$. I may employ a single disk on each shaft however, if found more desirable, or I may employ a greater number than two.

In order to enable the operator to control the angle or "gather" of the disks G', I provide a hand lever H connected by links $h$ to each of the boxes $g$ $g$ at points at a distance from their pivots so that by moving said lever H the disks of the frame may be adjusted and the said lever is provided with a pawl engaging a ratchet segment as shown for securing the lever and the boxes $g$ $g$ in any desired position. I also provide means for coupling the two main frames together, the said coupling means having provision for allowing the frames to approach or recede from each other as the furrows which they respectively follow approach or recede. To this end I pivot a coupling bar K to each frame as indicated at $k$, each of said bars extending toward the other frame and I connect said coupling bars by parallel links $k'$ $k'$ pivotally secured to each of said coupling bars, one end of each link being slotted if desired as shown in Fig. 1. This forms a yielding connection which holds the cultivator frames together and yet allows for the varying widths between adjacent furrows. I prefer to secure a seat supporting bar L pivotally to the links $k'$ $k'$ as shown and to secure the driver's seat L' to said bar L so that the weight of the driver will be equally distributed to the two frames and will assist in holding them down and preventing them from twisting.

It will be seen that all of the operating levers before referred to of both frames and the foot pieces $c'$ $c'$ of the trip levers will be within easy reach of the operator. I also provide the bar L with suitable foot rests $l$ $l$ as shown.

It is intended that the two row cultivator herein shown will be drawn by three horses and it will be provided with suitable horse attaching means for that purpose. It is obvious that by adding another cultivator frame and connecting it with one of those shown by a similar coupling mechanism, I can cultivate three rows at a time. I prefer that the points of pivoting $k$ of the coupling bars K shall be in different transverse planes as shown in the drawings as this will secure the best results and enable the driver's seat to be maintained in a central position at all times without twisting it to the right or left.

What I claim, and desire to secure by Letters Patent, is—

1. In a multiple row cultivator the combination with a series of cultivator frames, of coupling devices therefor comprising a coupling bar pivotally secured to each frame and extending toward its adjacent frame, and links connecting the said coupling bars, said bars and links turning freely on their pivots substantially as described.

2. In a multiple row cultivator the combination with a pair of cultivator frames, of coupling devices therefor comprising a coupling bar pivotally connected to each frame and extending toward the other frame pivoted parallel links for connecting said coupling bars said bars and links turning freely on their pivots and a driver's seat supported upon said links, substantially as described.

3. In a multiple row cultivator the combination with two main cultivator frames, of coupling devices therefor comprising a coupling bar pivotally secured to each frame and extending toward the other frame, parallel links, each pivotally connected to both of said coupling bars, a seat supporting bar pivotally connected to each of said links and a driver's seat secured to said seat supporting bar, substantially as described.

4. In an agricultural implement, the combination with the main frame provided with earth engaging devices, of conical guiding rollers for said frame, said rollers having their smaller ends extending outward to permit their inclined faces to engage the edges of a furrow, a space being provided between the large ends of said rollers forming a passage between them, substantially as described.

5. In a cultivator for listed corn the combination with a cultivator frame, provided with cultivating devices, of a truck frame pivotally connected to said cultivator frame and provided with guiding rollers having cone shaped peripheral portions, substantially as described.

6. In a cultivator for listed corn the combination with a main cultivator frame provided with cultivating devices, of a truck frame pivoted to the said cultivator frame, and having arms lying upon portions of the main frame, clips for engaging said arms and locking them to the main frame and a trip lever for releasing said clips, substantially as described.

7. In a cultivator the combination with the cultivator frame provided with disk supporting shafts, of pivoted boxes for said shafts and devices for adjusting said boxes and shafts, and devices for adjusting said shafts longitudinally through said boxes substantially as described.

8. In a cultivator the combination with the main frame, of the disk supporting shafts pivoted boxes for said shafts, said boxes having slots concentric with their points of pivoting and retaining bolts secured to the main frame and engaging said slots and an adjusting lever operatively connected with said boxes, and devices for adjusting said shafts longitudinally through said boxes substantially as described.

9. In a cultivator for listed corn the combination with the main frame, of the supporting rollers having cone shaped peripheral guiding portions for engaging the edges of the furrow, devices connected with said rollers for adjusting the same vertically, adjustable elastic runners for engaging the bottom of the furrow, and cultivating devices adjustable laterally, substantially as described.

In testimony whereof I affix my signature in presence of two witnesses.

ELI E. HARTZELL.

Witnesses:
   CHAS. O. GUDTNER,
   ASAD L. THOMPSON.